(No Model.) 2 Sheets—Sheet 2.

J. MENGE.
METHOD OF POLISHING RICE.

No. 493,509. Patented Mar. 14, 1893.

Witnesses
Percy C. Bowen
John C. Wilson

Inventor
Joseph Menge
By Whitman + Wilkinson
Attorneys

UNITED STATES PATENT OFFICE.

JOSEPH MENGE, OF NEW ORLEANS, LOUISIANA.

METHOD OF POLISHING RICE.

SPECIFICATION forming part of Letters Patent No. 493,509, dated March 14, 1893.

Application filed December 13, 1892. Serial No. 455,061. (No model.)

*To all whom it may concern:*

Be it known that I, JOSEPH MENGE, a citizen of the United States, residing at New Orleans, in the parish of Orleans and State of Louisiana, have invented certain new and useful Improvements in Methods of Polishing Rice; and I do hereby declare the following to be a full, clear, and exact description of the invention, such as will enable others skilled in the art to which it appertains to make and use the same.

My invention relates to methods of polishing rice.

In the ordinary treatment of rice, it is brought from the thrashing machine with the hull on, and in that form is known as "rough rice," or paddy. At the mill this rough rice is hulled between stones, is then pounded in a mortar to remove the cuticle which is collected as rice bran, and after the bran has been separated from the rice, the grains are polished.

The ordinary method of polishing the grains is well known in the art; but I have found that by mixing the cleaned rice with the hulls or "chaff" as it is called, and running the mixture through a mixer or scourer, the grains may be polished or scoured clean, and the sheepskin or leather pads commonly used in brushing may be done away with, either wholly or in part, in the latter case giving less work for brush, and a far better polish. The hulls or chaff of the rice, being rough like sand paper, polish the surface of the rice, and being light and springy do not break the rice. Moreover, the chaff is not deleterious to the rice, and is light and may be easily blown off after the scouring. The proportions of chaff and rice mixed together should be approximately half and half by bulk but may be varied at will.

One of the advantages over the present method is that the chaff mixes in freely and polishes the various portions of the ellipsoidal grains, while the leather sheet or pad presenting a flat surface to the grains can only rub a limited portion of each particular grain.

Another important feature of this method, is that the pounding can be stopped as soon as the bran or cuticle is loosened and partly off, leaving the chaff to scour the grain clean, and thus saving much time and power.

While many forms of apparatus might be used, for carrying out this method, two simple forms are illustrated in the accompanying drawings, in which the same parts are indicated by corresponding letters.

Figure 1:
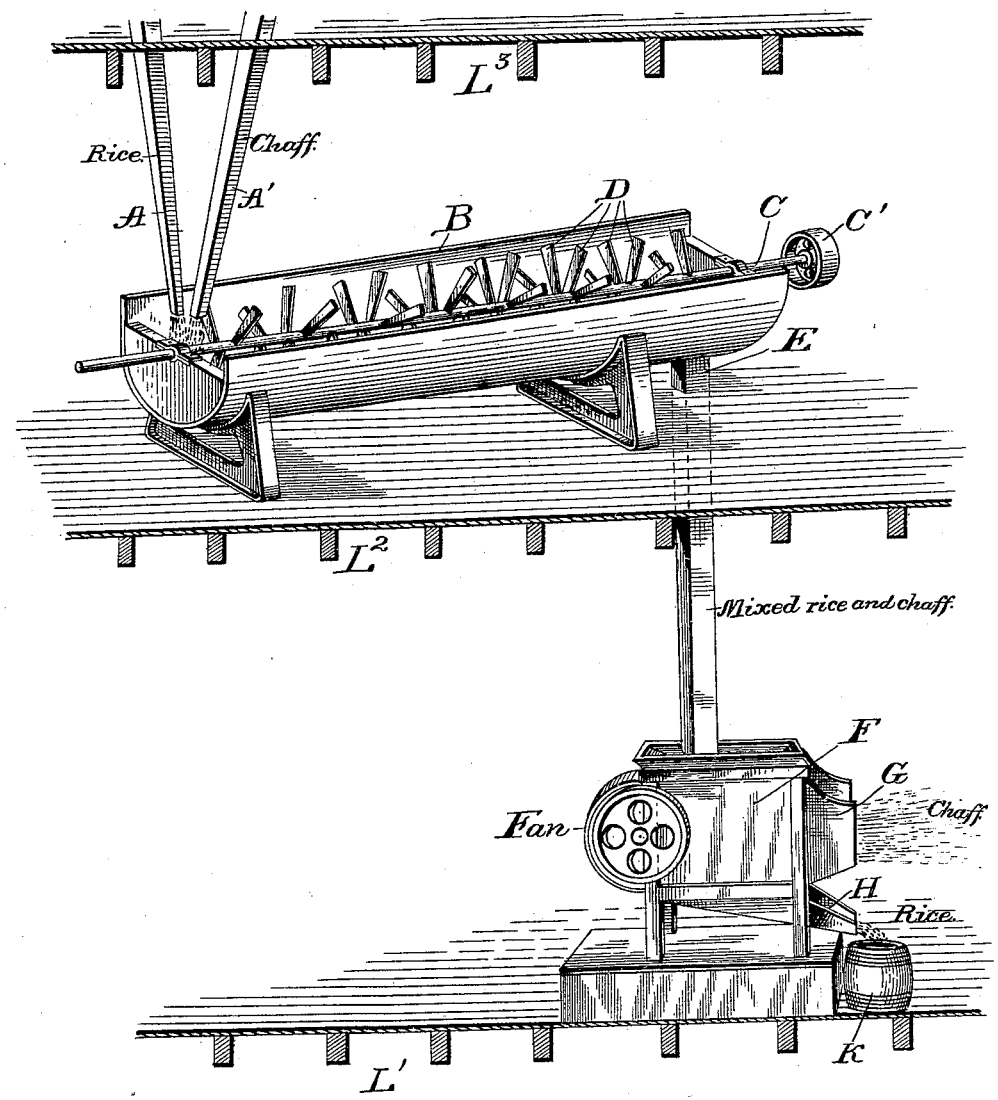
Figures 2, 3:
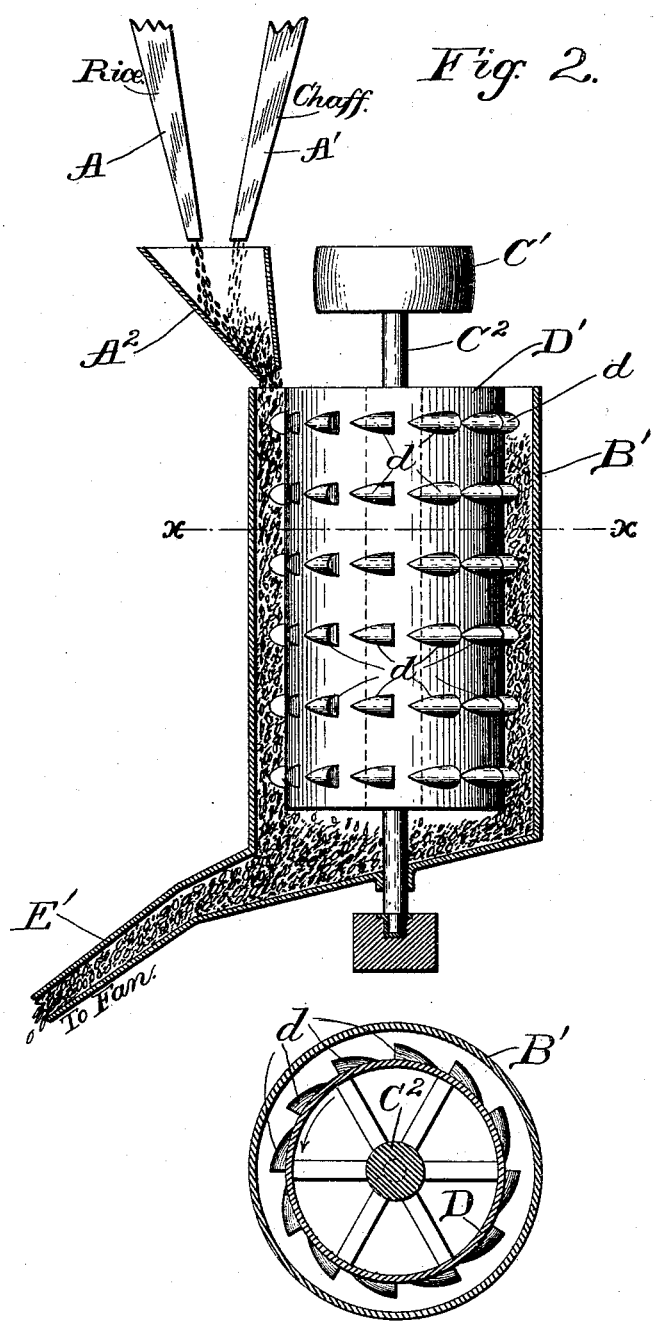

Figure 1 represents a section through three floors of a rice mill provided with devices for carrying out this method of polishing rice. Fig. 2 represents a central vertical section of another form of mixer and scourer, and Fig. 3 represents a section of the device shown in Fig. 2, along the line $xx$.

In Fig. 1, A represents a chute for the rice leading from a tank or receptacle (not shown), and A' represents a chute for the chaff leading from another tank or receptacle (not shown), or both rice and chaff may be sent down through the same chute.

B represents a mixer having a shaft C driven by a pulley C', and having blades or paddles D, which may, if desired, be either helicoidal in form or be arranged helicoidally on the shaft so as to push the grain from the one end of the mixer to the other, where a chute E carries it to the fan F which has an opening G for blowing out the chaff, and a chute H for delivering the cleaned and polished rice to the receptacle K.

L', $L^2$, and $L^3$ represent three floors or platforms for the various parts of the apparatus, but any desired arrangement of carriers, platforms, &c., may be adopted.

The device shown in Figs. 2 and 3 consists of the chutes A and A' for the rice and chaff, respectively, the hopper $A^2$, the cylindrical shell B' for receiving the mixture and the drum D' provided with teeth or projections $d$ adapted to keep the mixture well stirred. This drum is mounted on the shaft $C^2$ and driven by the pulley C'. After the particles of chaff and the grains of rice have passed through the mixer, they are carried off by the chute E' to a fan, or other separating device. It will be evident that the hollow cylinder and revolving drum shown in Fig. 2 may be placed horizontally, or inclined somewhat, and that the teeth may be arranged in a helicoidal curve so as to push the mixture from one end of the cylinder to the other.

The operation of the device is as follows:— The rice and chaff, either separately or already mixed, and run into the mixer, where they are thoroughly stirred together and incidentally the adhering particles of the cuticle, dust &c. are rubbed off of the rice by the chaff, and the mixture of bran, chaff and rice, is then taken to the fan or other separating device, where the chaff and bran are separated from the rice.

I do not limit myself to any particular kind of pounder, or friction rubbing machine to insure the trituration, and polishing desired.

It will be evident that many forms of apparatus could be used to accomplish the desired effect.

Having thus described my invention, what I claim, and desire to secure by Letters Patent of the United States, is—

1. A method of polishing rice, which consists in rubbing the hulled grains of rice against the rice hulls or chaff.

2. A method of cleaning and polishing rice, which consists in stirring a mixture of the hulled grains and chaff, and in separating from the grain the refuse matter, substantially as and for the purposes described.

In testimony whereof I affix my signature in presence of two witnesses.

JOSEPH MENGE.

Witnesses:
H. S. DAVIS,
A. M. ARTHUR.